C. DE L. RICE.
DROP HAMMER.
APPLICATION FILED JULY 28, 1917.

1,324,925.

Patented Dec. 16, 1919.
6 SHEETS—SHEET 3.

INVENTOR.
Charles D. Rice:

BY

H. E. Hart
ATTORNEY.

C. DE L. RICE.
DROP HAMMER.
APPLICATION FILED JULY 28, 1917.

1,324,925.

Patented Dec. 16, 1919.
6 SHEETS—SHEET 4.

INVENTOR.
Charles D. Rice:
BY
H. E. Hart
ATTORNEY.

C. DE L. RICE.
DROP HAMMER.
APPLICATION FILED JULY 28, 1917.

1,324,925.

Patented Dec. 16, 1919.
6 SHEETS—SHEET 5.

INVENTOR.
Charles D. Rice:
BY
H. E. Hart
his ATTORNEY.

C. DE L. RICE.
DROP HAMMER.
APPLICATION FILED JULY 28, 1917.

1,324,925.

Patented Dec. 16, 1919.
6 SHEETS—SHEET 6.

INVENTOR.
Charles D. Rice:
BY
his ATTORNEY.

UNITED STATES PATENT OFFICE.

CHARLES DE LOS RICE, OF HARTFORD, CONNECTICUT.

DROP-HAMMER.

1,324,925.  Specification of Letters Patent.  Patented Dec. 16, 1919.

Application filed July 28, 1917. Serial No. 183,335.

*To all whom it may concern:*

Be it known that I, CHARLES DE LOS RICE, a citizen of the United States, and a resident of Hartford, in the county of Hartford and State of Connecticut, have invented certain new and useful Improvements in Drop-Hammers, of which the following is a specification.

This invention relates to drop hammers and particularly to a novel means for raising the hammer in which the customary board is replaced by a flat, flexible strap, frictional means, as distinguished from a positive driving arrangement such as a crank, being provided for raising the hammers.

The invention is also concerned with other features of construction, adapted for use in machines of this type and, in some instances, regardless of the character of the hammer raising mechanism.

Referring to the drawings, A denotes the base or anvil; B, B', the uprights provided with the usual ways C, C', upon which the hammer D moves. E denotes generally the head of the machine; F the head shaft; G, G, the driving pulleys; H, the treadle; K, the friction rod, released when the hammer drops to set the lifting mechanism into operation, and raised when the hammer approaches its upper position to disconnect the lifting mechanism.

*The lifting mechanism.*

Figure 9:
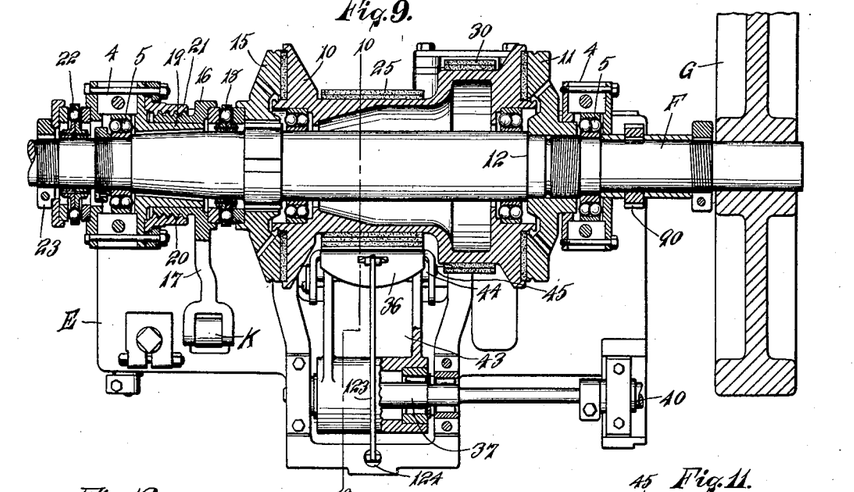
Fig. 9 is a detail sectional plan view on the line of 9, 9, of Fig. 1 showing the head of the machine and the lifting mechanism.
Figures 10, 11, 12, 13:
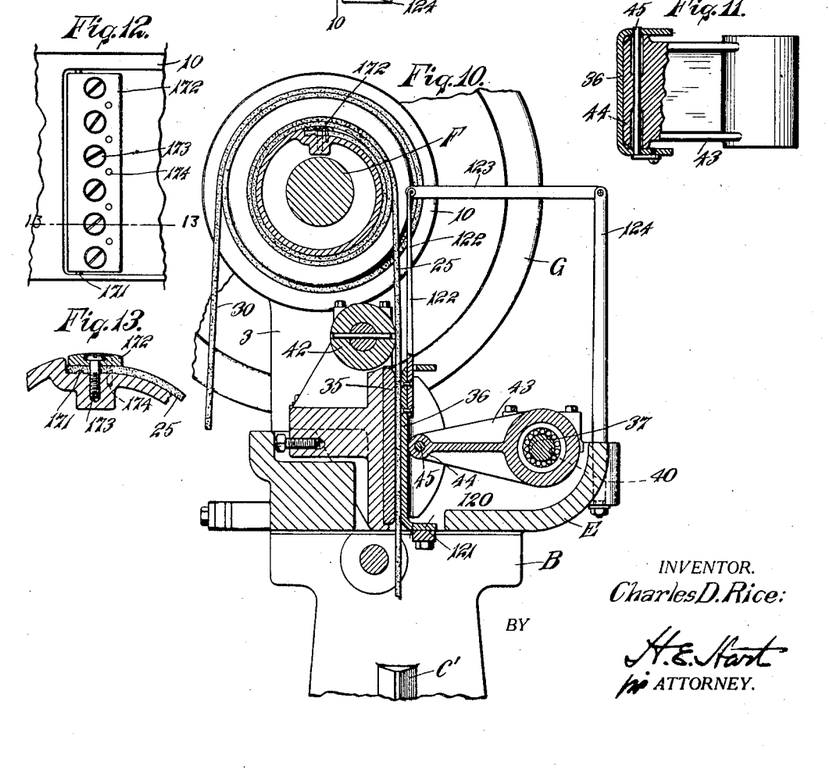
Fig. 10 is a sectional side view of the head of the machine on the line of 10, 10 of Fig. 9.
Fig. 11 is a detail view of the forward end of the eccentric link.
Fig. 12 is an exterior view of the spool showing the method of strap attachment.
Fig. 13 is a detail sectional view of a part of the spool on the line 13, 13 of Fig. 12.

The head E of the machine comprises a base 2 fitted and secured to the tops of the uprights. Upstanding from this base at each end are brackets, 3, 3, carrying the bearing boxes 4, 4, in which the head shaft F is mounted on ball bearings 5, 5, the driving pulleys G, G, being secured at either end of the shaft F. Loosely mounted on this shaft and supported on ball bearings 6, 6, is spool 10. At one end of the spool a disk 11 is threaded on the shaft up against a shoulder 12, the thread being of the proper direction (in this case left hand) so as to insure that the disk when in action will tend to tighten itself on the shaft. At the opposite end of the spool is a clutch disk 15, keyed to but slidable on the shaft, and back of this disk is a hollow screw 16, which carries an arm 17, to which the upper end of the friction rod K, is connected. Between the disk 15, and the screw 16, is a thrust bearing 18. This screw 16, is supported on a horn 19, projecting from a plate secured to the bearing box, and has large threads 20, which mesh with corresponding threads in a nut 21, mounted at the side of the bearing box 4. Another thrust bearing for the shaft F is provided at 22, held in place by the clamp collar 23. The disks 11, 15, are clutch disks, the latter being movable, and engage the ends of the spool 10, which is preferably of aluminum with its ends faced with leather. It will be evident that when the friction rod K, is released, the weight of the rod, through the arm 17, will slightly rotate the screw 16, in the nut 21, and the nut being stationary the screw will move to the right, sliding the disk 15, on the shaft and causing the spool to be pinched between the two clutch disks and so rotated with the shaft. It will thus be seen that the screw threads on the nut 21 and screw 16 form a cam which causes longitudinal movement of the screw upon rotation thereof.

In case the weight of the friction rod is not sufficient to effect the proper movement of the clutch disk, a spring 24, may be provided which is attached between the friction rod and a lug fixed on one of the uprights in such a way that its normal tendency is to draw the rod down.

A strap 25, is used for raising the hammer, having its lower end secured to the hammer in any manner, but preferably as will be hereinafter described, and its upper end secured to the spool. It is evident that as the spool 10, is rotated by the engagement of the clutch disks the strap 25, will be wound up and the hammer raised until it engages and raises the friction rod, which retracts the screw 16, disconnecting the clutch disks from the spool; at which time the friction rod is caught and held in raised position and a holding device, which will be later described, is brought into play to support the hammer in its raised position.

To hold the hammer in raised position, a stationary shoe 35, is mounted on the base 2, of the head E, and a movable shoe 36, is supported for a slight reciprocating movement toward and away from the stationary shoe 35.

This shoe is actuated by an eccentric 37 normally thrown into pinching position by a spring 38, which through the lever 39, rotates the eccentric shaft 40, this arrangement permitting the upward movement of the lifting strap between the two shoes, while a slight downward motion of the hammer, when the spool is released, tends to draw the two shoes together, thus gripping the strap and holding the hammer. The shoes are provided with broad engaging surfaces to prevent injuring the strap. An idling guide roll 42 slightly overhangs the fixed shoe 35 and properly directs the strap 25.

On the eccentric 37 is an eccentric link 43 comprising side arms and an end hub 44 having a longitudinal bore slightly larger at its ends than at the center. The front side of the hub 44 bears directly against the shoe 36 which is provided with rearwardly extending ears engaged by the end of the pin 45 which fits the smaller central portion of the bore. This allows of a slight spring to the pin so as to relieve it from any extraordinary strain when the eccentric link is pressing the shoe against the belt.

In order to prevent the movable shoe 36 from tipping too far out of position as it is withdrawn to release the hammer, it is provided with a bottom flange, 120, which slides on a flat surface 121 on the head and the upper end of the shoe is supported by a yielding member 122, connected at its upper end to a link 123, the other end of which is supported by a post 124.

In order to fasten the strap to the spool the face of the spool at one side is gradually spiraled up to a shoulder and to a sufficient depth to take the thickness of the strap and a clamping plate, thus providing an even circular winding surface. A slightly upstanding rib 171 is formed lengthwise of the face of the spool onto which the strap can be clamped to cause it to bite. 172 is a clamp plate secured in position by bolts 173 which are threaded into the spool. 174 are dowel pins extending through the clamping plate and belt into the spool and arranged in front of the bolts or on that side of the bolts from which the pull comes.

The pull rod 41 is connected to the lever 39, and pressure on the treadle H rocks this lever 39, turning the eccentric and withdrawing the movable shoe 36, releasing the strap and permitting the hammer to fall.

Figures 4, 8:
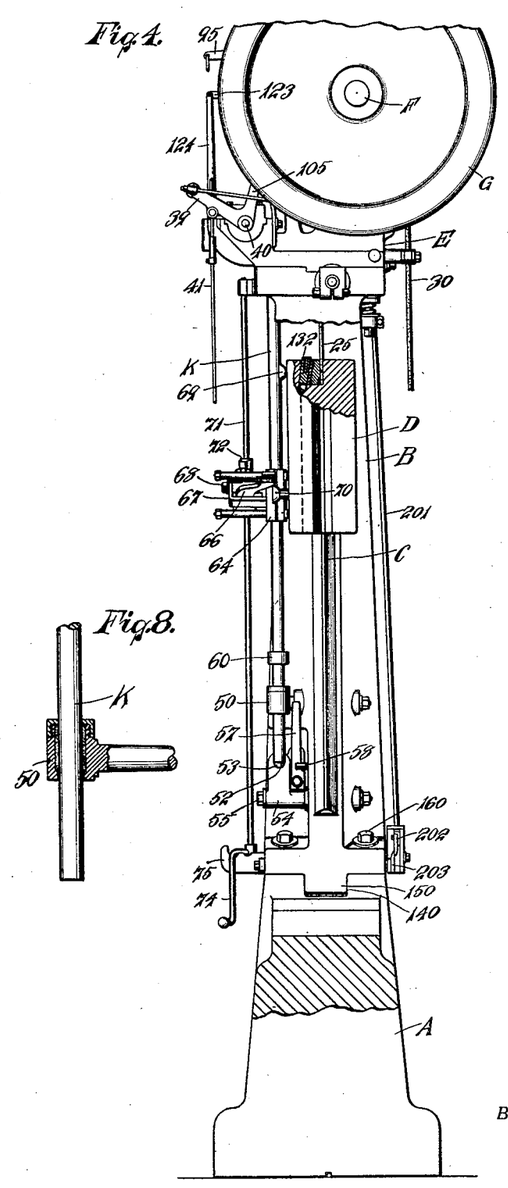
Fig. 4 is a part sectional view on the line of 4, 4, of Fig. 1.
Fig. 8 is a detail plan view partly in section showing the leather bushing for the friction rod.
Figure 16:
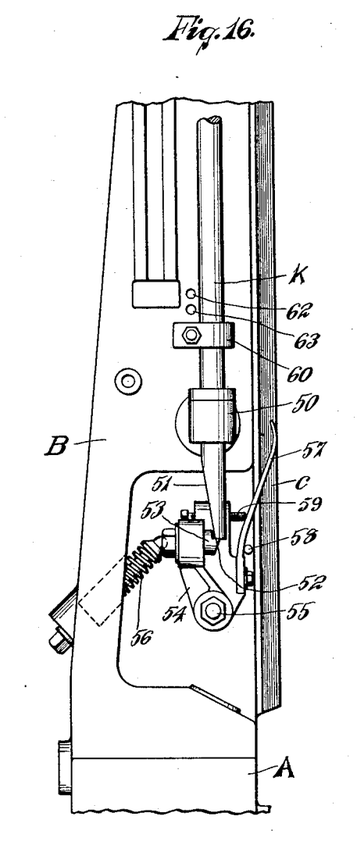
Fig. 16 is a detail front view of one of the side uprights on enlarged scale showing the mechanism coöperating with the bottom of the drop rod.
Figure 17:
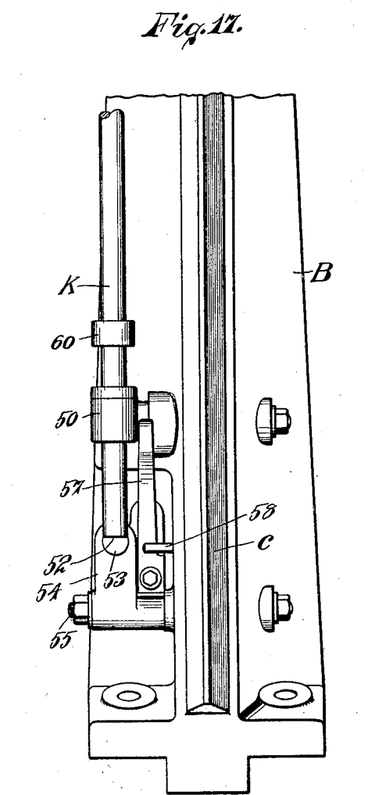
Fig. 17 is a side view thereof looking from the right of Fig. 16.

The friction rod $k$ is guided and prevented from rebounding by a leather-lined bushing 50 (see Fig. 8) through which it projects and which provides a slight frictional, or gripping, contact on the rod. When in its raised position the lower end of the friction rod, which is slightly beveled as indicated at 51, rests on the flat end 52 of a step 53, mounted in a rocker 54 fulcrumed on the upright as at 55 and held in its forward position by the spring 56. The rocker also carries an upstanding arm 57 which projects into the path of movement of the falling hammer, which at this side is tapered according to the design desired. A stop pin 58 limits the forward movement of the rocker 54 and the upstanding arm 57 can be sprung slightly by the adjusting screw 59 to get a proper adjustment of the position of the upper end of the arm 57. This arm 57 has sufficient spring to take the shock as the hammer falls, but is stiff enough to move the rocker 54 against the spring 56 to a sufficient extent to take the flat end 52 of the step 53 out from under the friction rod, leaving it free to drop and throw the lifting mechanism into operation.

It will be seen that the pressure of the step 53 against the tapered end of the friction rod presses it against the side of the leather lined bushing 50 and assists in holding it against rebounding such as would lessen the grip at the spool.

On the friction rod K is a collar 60 which is engageable with a manually operated lever 61, by means of which the friction rod can be raised and then held in position by a pin insertible through one of the apertures 62, 63, in the upright in order that the hammer can be left in its low position while adjustments are being made, such as die setting, etc.

Under normal operating conditions the hammer automatically raises the friction rod as it reaches its top position to disengage the clutch from the spool in the usual manner.

Figure 7:
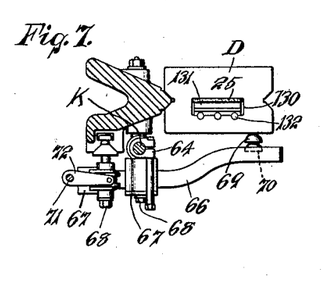
Fig. 7 is a detail plan view, showing one way in section, and illustrating the method of adjustment of the friction rod lifting lever.

To accomplish the raising of the friction rod, a sleeve 64 is secured to it and has a bracket 65 through which extends the arm 66, the inner end of which is in position for engagement with a stud on the hammer, the outer end of which is secured to a carrier 67 mounted on a stud 68 which is adjustable vertically on the upright. The hammer is provided with two studs 69, 70, the former at the top of the hammer being shorter than the latter which is at the bottom of the hammer. The carrier 67 can slide on its stud 68 moving the arm 66 in the bracket 65 so as to carry it away from the face of the hammer to permit the pin 69 to pass without engaging the end of the arm, and leaving it in position to be engaged by the pin 70. This provides two adjustments to limit the amount the hammer is raised in addition to the usual adjustment secured by moving the stud 68 and the sleeve 64 up and down along the upright and friction rod. As a means for sliding the carrier 67 on its stud there is provided a rod 71 supported at top and bottom, having secured near its upper end a lever 72 with a pin 73 entering a slot in the carrier. This rod can be turned by a hand lever 74 secured to its lower end in position to be reached by the operator while running the machine, and held in either position by a notched plate 75.

The check strap 30 is secured at one end to the spool 10 and at its lower end is anchored on the drum 76 mounted on the bracket 77 secured to the upright B'; the length of the check strap can be adjusted by releasing the clamping nut 78 and rotating the drum 76 to take up the check strap to the desired amount.

The treadle is adjustably supported to suit varying conditions, a clamp stud 80 being mounted in the upright B', and having a clamping head 81 at its end to receive the bar 82, which at its lower end is provided with a bearing 83 within which the treadle is journaled.

This arrangement provides for an adjustment of the position of the treadle both vertically and laterally, reduces the weight of the treadle, and provides a treadle support on the upright above the anvil.

As has been hereinabove stated, the pull rod 41 which at its lower end is connected with the treadle, is at its upper end connected with lever 39, and the spring 38 forces the eccentric to clamp the strap and hold the hammer in raised position. Therefore, in order to release the hammer the operator must put enough pressure on the treadle to overcome this spring. In order to lighten this effort for the operator a mechanism is provided which can be set in motion by a comparatively slight exertion, and which when once started will mechanically cause the movement of the eccentric to release the strap and permit the hammer to drop.

Figure 14:
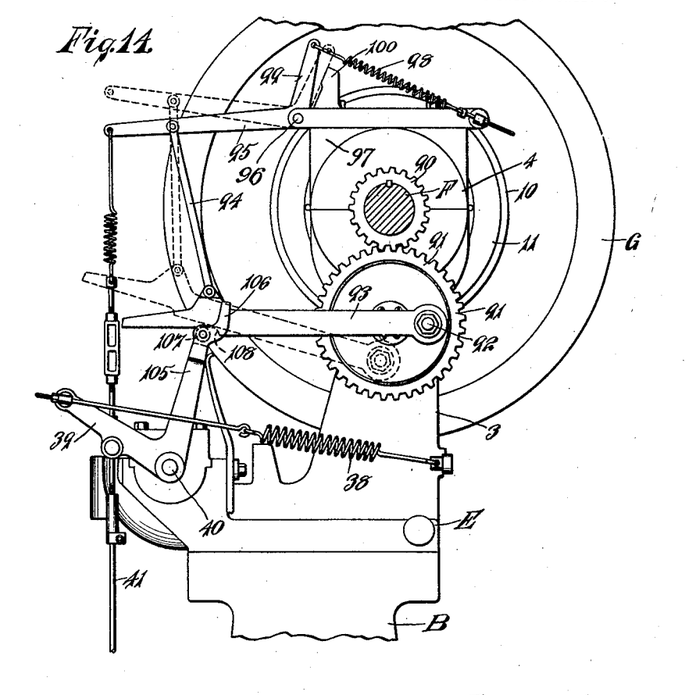
Fig. 14 is an enlarged view of the head of the machine showing the mechanical tripping mechanism.
Figure 15:
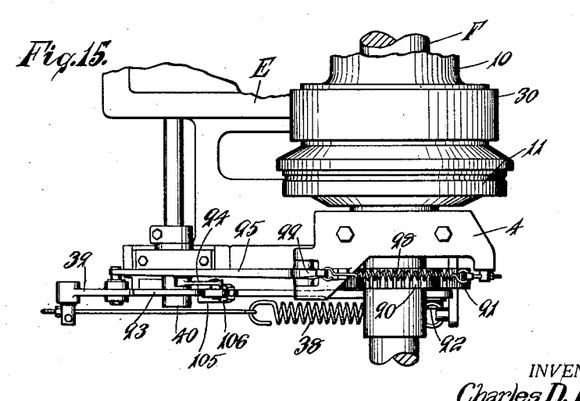
Fig. 15 is a plan view of the mechanism shown in Fig. 14.

This mechanism comprises the following instrumentalities: On the head shaft F is a pinion 90 meshing with the gear 91 mounted on bearings in one of the brackets 3 of the head E. Mounted in this gear and off center so as to have a crank action is a stud 92, upon which is fulcrumed a kicker 93, the outer end of which is supported by a link 94 connecting it with a lever 95 fulcrumed as at 96 on a member 97 secured to the top of one of the head brackets 3. The lever 95 is normally retracted by a spring 98 to bring an upstanding arm 99 against a stop 100, thus raising the kicker 93. This spring 98 is a comparatively light spring, possibly of 15 pounds pull, while the spring 38 operating the lever 39 has a very heavy pull. Secured to the eccentric shaft 40, either separately or as a part of the lever 39, is an upstanding arm 105 slotted at its upper end as at 106 to act as a guide for the kicker 93 which, it will be noted, has an irregular reciprocating motion due to the crank action of the stud 92 on which it is fulcrumed. This upstanding arm just below the slotted portion has a hub 107 adapted to be engaged by a shoulder 108 on the kicker 93. The lever 95 is connected to the treadle, in which case the rod 41 is so arranged as not to operate the lever 39. In order to draw it down out of its normal position the weight of the spring 98 is all that must be overcome. This drops the kicker 93 into position so that upon the rotation of the gear 91 the shoulder 108 will strike the hub 107 of the arm 105 throwing it over against the pull of the spring 38 until the eccentric has been rotated sufficiently to withdraw the movable shoe 36, releasing the hammer and allowing it to drop. By this arrangement it will be seen that the strain on the operator in tripping the hammer is very greatly reduced.

It will of course be understood that when repeated blows are being used the operator must exert some continued force on the treadle to prevent reëngagement of the clamps with the lifting strap. The fact that the line of pull with the heavy spring is brought more nearly to the dead center of the eccentric shaft serves to greatly lessen the pressure required to perform this function as against the tripping of the hammer without the mechanical means described above. This arrangement is particularly useful with the heavier hammers where without it the operator would be required to exert a very considerable force in order to release the hammer. For lighter hammers this arrangement may be dispensed with and the treadle connected directly to a lever such as 39, which is fast on an eccentric shaft.

Figure 5:
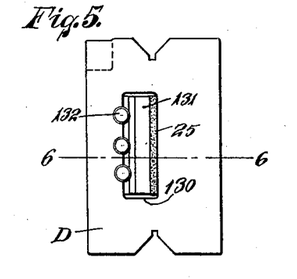
Fig. 5 is a top view of the hammer showing the manner of securing the strap therein.
Figure 6:
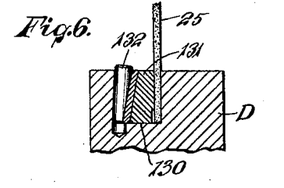
Fig. 6 is a sectional view on the line of 6, 6, of Fig. 5.

To secure the strap to the hammer, a slot or recess 130 is cut in the top of the hammer wide enough to receive the end of the flat strap. A block, 131, preferably of wood and having a tapered rear face covered with a steel plate, is then set into the recess at one side of the strap; then several steel pins, 132, flat at one side to have a substantial bearing against the block 131, are fitted into holes drilled into the top of the hammer at a slight angle and driven home. It will be noticed that the face of the block 131 is cut away at the bottom so that the end of the strap is not clamped, thus assisting in providing a secure fastening of the strap to the hammer.

Figure 1:
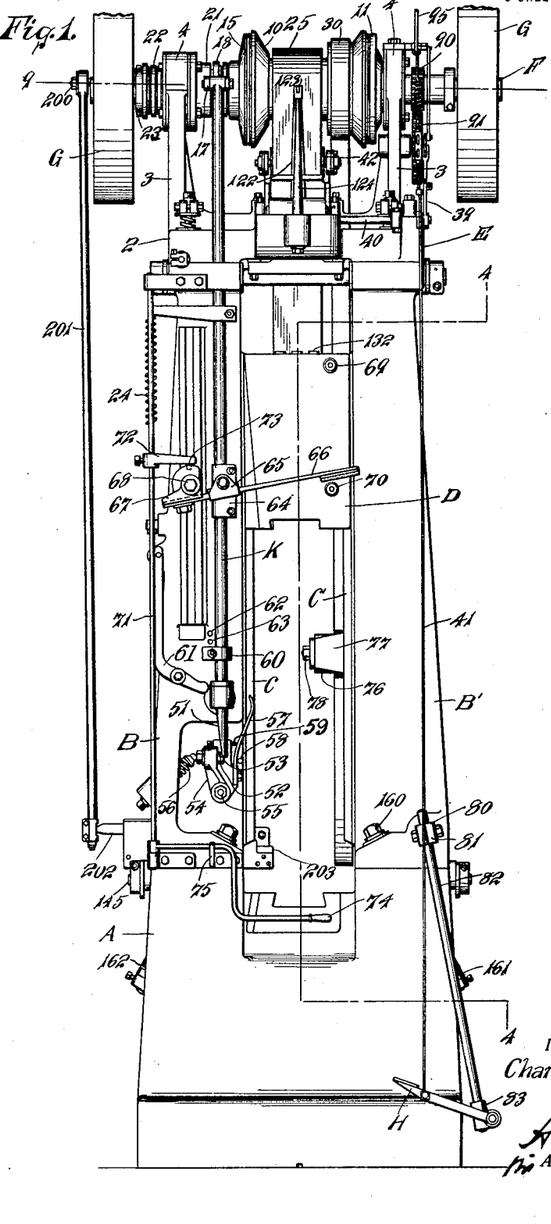
Figures 1 is a front elevation of a machine in accordance with my invention.
Figures 2, 3:
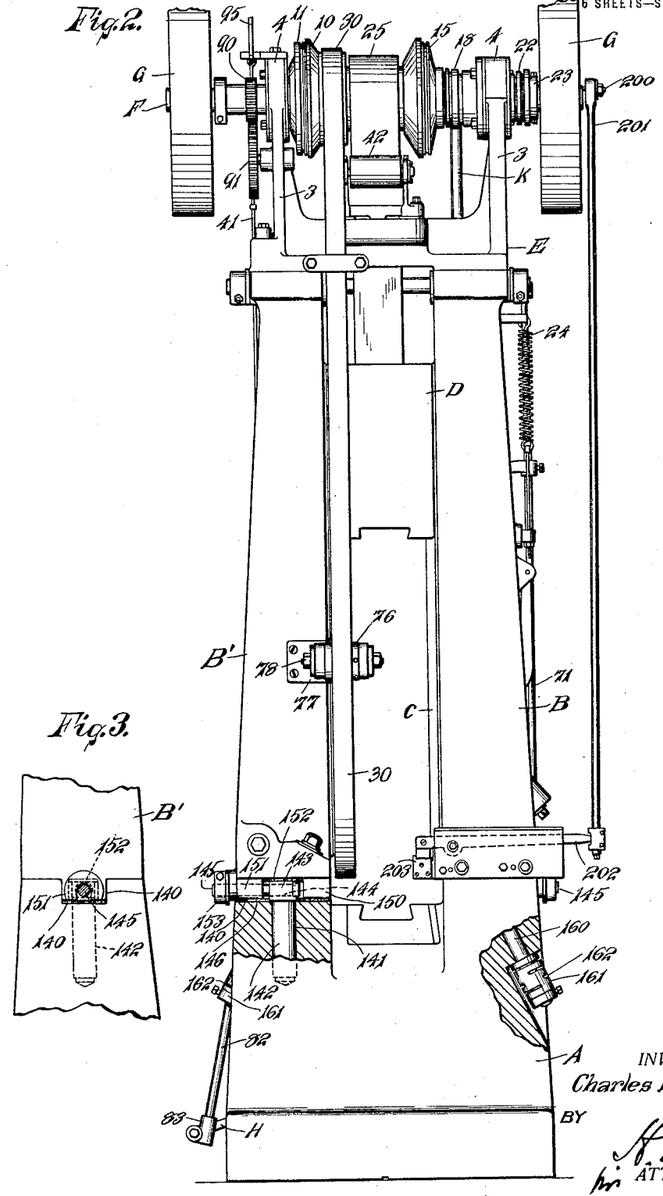
Fig. 2 is a rear elevation of a machine made in accordance with my invention.
Fig. 3 is a detail view showing the method of adjusting the ways on the anvil.

In fitting the uprights to the anvil, the latter is transversely slotted as at 140 and from the bottom of the slot a hole 141 is drilled down into the anvil, in which is seated a pin 142 having a head 143 which is bored as at 144. In the bore of the head of this pin there is fixed a headed bolt 145 which extends out beyond the anvil. A leather pad 146 is fitted in the bottom of the slot and under the head of the pin. On the bottom of the upright are two tongues, one, 150, solid and fitting in the slot behind the head of the bolt; and the other 151, grooved to straddle the bolt 145. Between the tongues the bottom of the upright is chambered out to receive the head of the pin 142, and a leather pad 152 is inserted between the head of the pin and the upright. A nut 153 is threaded onto the end of the bolt and bears against the side of the upright, and by this means the upright can be shifted on the anvil. To tie the upright to the anvil, bolts 160 are provided, their lower ends anchored in the anvil and bearing against a yielding cushion in the form of a tubular metal block 161 apertured to receive the bolt, and at different levels transversely slotted on four different sides, as indicated at 162.

In case a greater drop is desired than is provided by the standard length or height of the uprights, the head may be removed and extension pieces clamped to the top of the uprights, upon which the head may then be mounted. By this means the distance which the hammer can be raised can be varied to suit any given requirements, and thus greatly increase the capacity of the machine, or at least give to the machine a capacity for doing certain classes of work which could not be performed with the standard distance of hammer movement.

Driven from the main shaft by a crank 200 is a link 201 communicating motion to a rocking blade 202 which coöperates with a stationary blade 203 positioned at the rear of one way and just above the lower die. This blade is constantly rocking and is of great value in the trimming and cutting of forgings from a bar of stock which is being worked.

I claim as my invention—

1. In a machine of the character described a main driving shaft mounted in suitable bearings, a spool freely rotating on said shaft, devices frictionally engaging the ends of said spool for connecting it to said shaft, and a cam for actuating said devices to cause them to grip said spool.

2. In a machine of the character described a main driving shaft mounted in suitable bearings, a spool freely rotating on said shaft, devices frictionally engaging said spool for connecting it to said shaft, and a cam for actuating said devices to cause them to grip said spool.

3. In a machine of the character described a main driving shaft mounted in suitable bearings, a spool freely rotating thereon, a friction rod, means for raising it, means for holding it in raised position, means for releasing it, and rotary means actuated by said friction rod when it is released to frictionally engage the ends of said spool and connect it to said shaft.

4. In a machine of the character described a main driving shaft mounted in suitable bearings, a hammer suitably guided for reciprocal vertical movement, a spool freely rotating on said shaft, a flexible strap connected between said spool and hammer, clamping devices mounted on said shaft and movable longitudinally thereof to frictionally engage the ends of said spool to connect it with said shaft to raise said hammer, and a cam for actuating said devices.

5. In a machine of the character described a main driving shaft mounted in suitable bearings, a hammer suitably guided for reciprocal vertical movement, a spool freely rotating on said shaft, a flexible strap connected between said spool and hammer, a clamping means mounted on said shaft frictionally engaging the ends of said spool to connect it for rotation with said shaft to raise said hammer, means for disengaging said frictional engaging means from said spool and means operatively connected with power-driven members to engage said strap to hold said hammer in raised position.

6. In a machine of the character described a main driving shaft mounted in suitable bearings, a spool freely rotating on said shaft, a disk secured to said shaft adjacent one end of said spool, a second disk movable longitudinally of said shaft for the purpose of frictionally engaging the ends of said spool between said disks to cause the rotation of said spool with said shaft and a cam for actuating said last named disk.

7. In a machine of the character described a main driving shaft mounted in suitable bearings, a spool freely rotating on said shaft, a disk mounted on said shaft adjacent one end of said spool, a second disk keyed to and sliding along said shaft at the opposite end of said disk, and a cam for moving the last mentioned disk toward the former to frictionally engage the ends of said spool between said disks.

8. In a machine of the character described a main driving shaft mounted in suitable bearings, a spool freely rotating thereon, a disk fixed on said shaft adjacent one end of said spool, a second disk carried on said shaft adjacent the opposite end of said spool, a strap having one end secured to said spool, a hammer at the opposite end of said strap, guideways for the hammer, a friction rod, means for holding it in raised position, means for releasing said rod when the hammer descends, a stationary member, a member carrying said rod and coacting with said stationary member so as to move to and from said last mentioned disk when said rod is reciprocated, and a thrust bearing between said last mentioned member and the last mentioned disk.

9. In a machine of the character described a main driving shaft mounted in suitable bearings, a hammer suitably guided for reciprocating vertical motion, a spool freely rotating on said shaft, a strap with one end attached to said spool and its opposite end to said hammer, means for connecting said spool to said shaft to cause its rotation therewith in one direction to raise said hammer, means for disengaging said spool from said shaft to permit of its rotating in the opposite direction, and a check strap wound upon said spool opposite to said lifting strap and anchored at its lower end on the machine frame.

10. In a machine of the character described the machine frame, a main driving shaft mounted in suitable bearings at the upper end thereof, a hammer suitably guided for reciprocating vertical motion, a spool freely rotating upon said shaft and engageable therewith, a lifting strap with one end attached to said spool and the other end to said hammer, means for connecting said spool to said shaft to wind said strap thereon to raise said hammer, means for disconnecting said spool from said shaft to permit of its rotating oppositely to the shaft as the hammer descends and means for stopping the rotating of said spool when said hammer has reached the bottom of its stroke.

11. In a machine of the character described a main driving shaft mounted in suitable bearings, a spool freely rotating on said shaft and movable to a limited extent longitudinally thereon, a disk carried on said shaft adjacent to one end of said spool, a second disk movable longitudinally on said shaft and positioned adjacent to the other end of said spool, a shifting member adapted for relative rotatable and longitudinal movement on said shaft, an anti-friction thrust bearing between one of said disks and member, a stationary member engaged with said shifting member, and a vertically reciprocating friction rod connected to said shifting member.

12. In a machine of the character described a frame, a hammer suitably guided therein for reciprocating vertical motion, a broad, flat strap constituting a hammer lifting means, a pair of coöperating shoes between which said strap moves, one of said shoes being fixed and the other movable toward and from said strap, and power operated means for moving said last mentioned shoe from the stationary shoe to release said strap.

13. In a machine of the character described a frame, a hammer suitably guided therein for reciprocating vertical motion, a broad, flat strap constituting a hammer lifting means, a pair of coöperating shoes between which said strap moves, one of said shoes being fixed and the other movable toward and from said strap, power operated means for moving said last mentioned shoe from the stationary shoe to release said strap, and means for controlling the position of said movable shoe during its movement toward and away from the stationary shoe.

14. In a machine of the character described the combination with a frame, a hammer suitably guided therein for reciprocating vertical motion, a strap constituting a hammer lifting means, means for engaging said strap to hold said hammer in raised position said means comprising a stationary shoe of substantial area, a movable shoe, an eccentric link to the forward end of which said movable shoe is secured, an eccentric upon which the rear end of said link is mounted, and power operated means for moving said eccentric to cause said strap to be released.

15. In a machine of the character described the combination with the machine frame, a hammer, a flexible lifting strap for said hammer, of gripping means for said strap comprising a stationary shoe and a movable shoe, an eccentric, an eccentric link mounted thereon at one end and with its forward end bearing against said movable shoe, means for securing said shoe to said link, and means for relieving shearing strain on said securing means.

16. In a machine of the character described the combination with the machine frame, a hammer, a flexible lifting strap for said hammer, of gripping means for said strap comprising a stationary shoe and a movable shoe, an eccentric, an eccentric link mounted thereon, a hub at the forward end of said link bearing against said movable shoe and having a longitudinal bore larger at its ends than at the center, and a pin fitting the central portion of the bore of said hub and extending beyond the ends thereof to engage said shoe.

17. In a machine of the character described the combination with the machine frame, a hammer, and a flexible lifting strap for said hammer, of gripping means for said strap comprising a stationary shoe and a movable shoe, an eccentric, an eccentric link mounted on the eccentric at one end and connected with and bearing against said movable shoe at its opposite end, a post mounted in the frame of the machine, a link having one end connected with said post and a controlling member connected between the opposite end of said link and said movable shoe.

18. In a machine of the character described, the combination with the machine frame, the hammer a flexible lifting strap therefor and a spool for said strap, of gripping means for said strap comprising a stationary and a movable shoe, and a guide roll positioned between said spool and above and slightly overhanging the face of said stationary shoe.

19. In a machine of the character described, a frame, a driving shaft mounted in suitable bearings therein, a spool mounted on the driving shaft, a hammer, a strap connected between said hammer and said spool and adapted to be wound upon the latter to raise said hammer, a gripping device for said strap including a stationary shoe, and a guiding idle roll interposed between said spool and stationary shoe and with its surface alined with the latter.

20. In a machine of the character described, a spool, a lifting strap adapted to be wound on said spool, that part of the surface of said spool which receives said strap being of spiral shape to form a shoulder, and means for securing the ends of said strap to the surface of said spool adjacent said shoulder.

21. In a machine of the character described, the combination with a frame, a hammer, and hammer lifting mechanism, of a friction rod controlling the engagement and disengagement of said hammer lifting mechanism, means for lifting said friction rod comprising an arm connected therewith and with its free end projecting adjacent to the face of the hammer, means for swinging the free end of said arm toward or away from said hammer, and a plurality of studs on said hammer coöperating with said arm in its different positions in respect to the face of the hammer.

22. In a machine of the character described, the combination with a frame, a hammer, and hammer lifting mechanism, of a friction rod controlling the engagement and disengagement of said hammer lifting mechanism, means for raising said friction rod comprising an arm connected with said rod and with its free end projecting adjacent to a face of said hammer, means engaging the rear end of said arm for swinging its free end toward and away from the face of said hammer, a plurality of studs in the face of said hammer one above the other, a lower stud projecting beyond an upper stud.

23. In a machine of the character described, the combination with a frame, a hammer, and hammer lifting mechanism, of a friction rod controlling the engagement and disengagement of said hammer lifting mechanism, means for raising said friction rod comprising a bracket secured to said rod, an arm mounted in said bracket and slidable therein to carry its free end toward or from the face of said hammer, a stud mounted on the frame of the machine, a carrier mounted on said stud and to which the rear end of said arm is secured, means for sliding said carrier on its stud, and a plurality of studs mounted in the face of said hammer and projecting at different distances therefrom to coöperate with said arm in its different positions.

24. In a machine of the character described, a friction rod, a lifting mechanism connected therewith comprising an arm connected with said rod but movable relative thereto, a sliding carrier to which the rear end of said arm is connected, a crank connected with said carrier, and means for moving said crank to shift the position of said arm.

25. In a machine of the character described, a friction rod tapered at its lower end, a step for holding said rod in raised position, a bushing positioned above said step and through which said rod extends, means for moving said step out from under said rod to permit the latter to drop, and a spring pressing said step against said rod to bind it in said bushing to steady said arm and prevent chattering thereof.

26. In a machine of the character described, a friction rod tapered at its lower end, a step for holding said rod in raised position, a leather-lined bushing positioned above said step and through which said rod extends, means for moving said step out from under said rod to permit the latter to drop, and a spring pressing said step against said rod to bind it in said bushing to steady said arm and prevent chattering thereof.

27. In a machine of the character described, the combination with a hammer and the ways upon which it slides, of a friction rod, a fulcrumed rocker, a step carried thereby and adapted to receive and support the lower end of said rod and holding it in raised position, a stop to limit the forward movement of said rocker, a spring pressing said rocker against said stop, and an adjustable knock off arm carried by said rocker and adapted to coöperate with a beveled face of said hammer.

28. In a machine of the character described, the combination with a frame, a hammer, and hammer lifting mechanism, of a friction rod, means for holding it in raised position, means for disengaging said rod from said holding means, and a spring connected with said rod and assisting to cause its movement when released from said holding means.

29. In a machine of the character described, a friction rod, a lifting arm connected with said rod, a stud adjustably mounted on the machine frame, and a carrier mounted on said stud and adjustable longitudinally thereon and to which the rear end of said arm is connected.

30. In a machine of the character described, a hammer, a hammer lifting strap, and means for attaching said strap to said hammer, comprising a shoe fitted in a recess in the top of the hammer in which the end of said strap is positioned, and bearing against said strap, the rear face of said shoe being beveled, a metal plate fitting against the beveled side of said shoe, and pins driven into notches in the edge of the recess of said hammer and bearing against said plate to clamp said shoe against said belt.

31. In a machine of the character described an anvil and ways mounted therein the top of said anvil being slotted and vertical holes formed in the bottom of said slots, pins fitting in said holes and having bored heads fitting in the slots, tongues on the base of said ways fitting in the slots at either side of said pin heads, the outer tongues being bifurcated, bolts mounted in the bores of said pin heads and held against rotation and extending through the bifurcations in one of the tongues of each way, and nuts engaging the threads of said bolts and bearing against the sides of the ways.

32. In a machine of the character described an anvil having a transverse slot in its upper surface and a hole drilled into the anvil from the bottom of said slot, a pin fitting in said hole and having a bored head fitting said slot, a bolt fitting the bore in said pin head and extending outwardly from said anvil and held against rotation, ways resting on said anvil and having tongues fitting in said slot, one of said tongues being bifurcated to fit over said bolt, cushioning pads interposed between the head of said pin and the way and between the bottom of said tongues and the anvil, and a nut engaging the threads on the outer end of said bolt and bearing against the side of said way.

33. In a machine of the character described the combination with the frame, the hammer, hammer lifting mechanism including a main driving shaft, means for holding said hammer in raised position, means for releasing said holding means comprising a member connected with and actuating a movable part of said holding means, a kicker, a continuous driving connection between said shaft and kicker imparting to it a reciprocating motion, means for holding said kicker up out of engaging position with said member, a treadle, and connections between said treadle and said kicker-holding means to bring said kicker into engaging position relative to said member.

34. In a machine of the character described, a main driving shaft mounted in suitable bearings, a spool member fixed on said shaft, a slidable friction member on said shaft, a member having a cam surface, a binding member having rotary movement relative to and mounted on said shaft in engagement with said cam, and means for rotating said binding member on the shaft to force said spool and friction member into coöperative engagement.

35. In a machine of the character described, a main driving shaft mounted in suitable bearings, a hammer suitably guided for reciprocal vertical movement, a spool freely rotating on said shaft, a flexible strap connected between said spool and hammer, a shiftable friction member mounted on said shaft to rotate therewith, a binding member having a limited rotary movement relative to said shaft and longitudinally movable thereon when rocked to force said friction member against and withdraw the same from said spool and means for rotating said binding member.

36. In a machine of the character described, a frame, a hammer suitably guided therein for reciprocating vertical motion, a broad flat strap constituting a hammer lifting means, a pair of coöperating shoes between which said strap moves, one of said shoes being movable to and from said strap, power operated means for said movable shoe, and manual control means for said power operated means.

CHARLES DE LOS RICE.